(Model.)
G. T. BECK.
Mechanical Movement.
No. 235,984.  Patented Dec. 28, 1880.
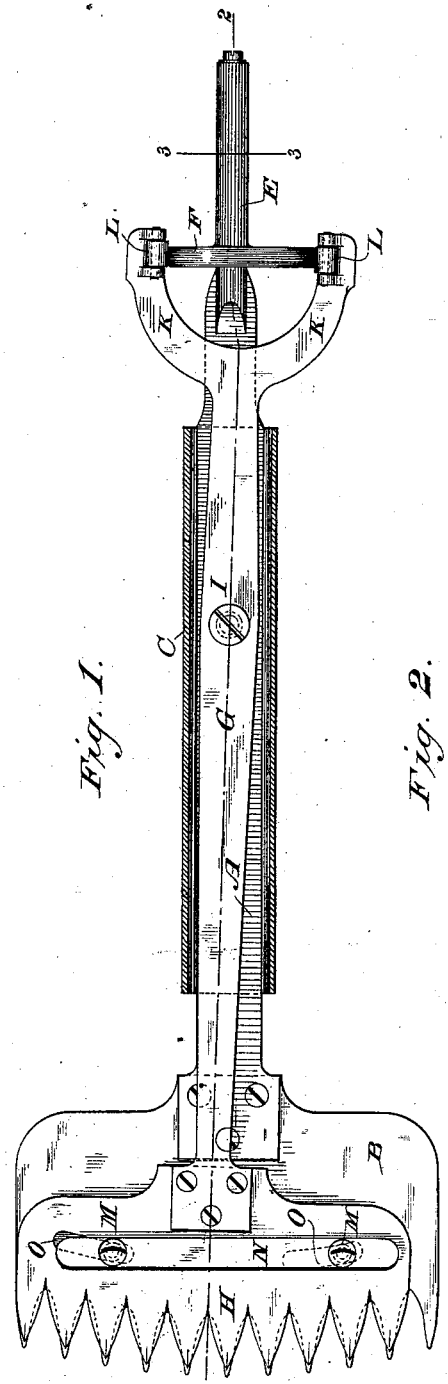
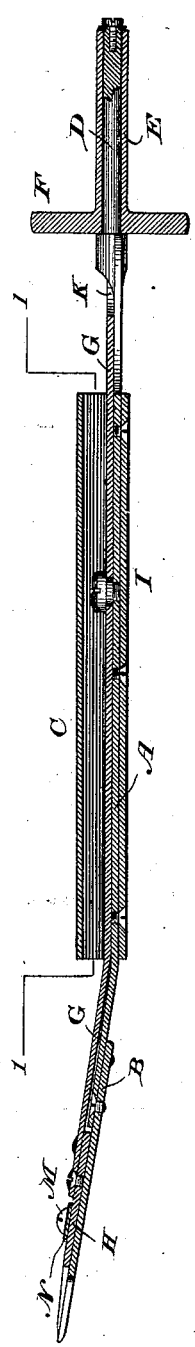
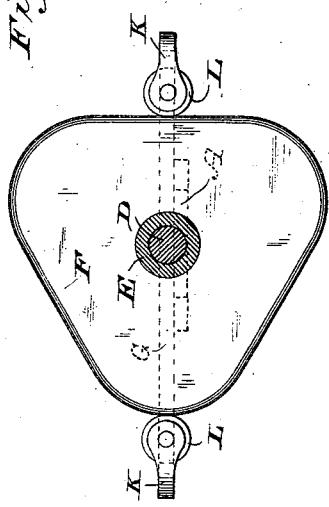
WITNESSES
Wm. A. Skinkle.
Chas. H. Baker.
INVENTOR
George T. Beck.
By his Attorneys
Baldwin, Hopkins, & Peyton.

UNITED STATES PATENT OFFICE.

GEORGE T. BECK, OF LEXINGTON, KENTUCKY.

MECHANICAL MOVEMENT.

SPECIFICATION forming part of Letters Patent No. 235,984, dated December 28, 1880.

Application filed April 9, 1880. (Model.)

*To all whom it may concern:*

Be it known that I, GEORGE T. BECK, a citizen of the United States, and a resident of Lexington, in the county of Fayette and State of Kentucky, have invented certain new and useful Improvements in Mechanism or Mechanical Movements Applicable to Shears for Shearing Sheep and other Animals, and to other devices, of which the following is a specification.

For convenience of illustration, I have shown my improvements as applied to shears which are operated by power through the instrumentality of a flexible shaft; but I claim no novelty in the shears themselves, and I only describe them for the purpose of making my real invention plainly understood.

My invention relates to means for vibrating the upper shear-arm, and may be used for other purposes.

In the accompanying drawings, illustrating my invention, Figure 1 is a plan view showing the shear-handle in section on line 1 1 of Fig. 2. Fig. 2 is a longitudinal section through line 2 2 of Fig. 1. Fig. 3 is an end view, on an enlarged scale, of the shear-arm-vibrating mechanism, partly in section, on the line 3 3 of Fig. 1.

A indicates the lower fixed shear-arm, to which are secured the lower shear-plate, B, the hollow handle C, and the sleeve-axle D, which last is the bearing of the rotary sleeve E and triple cam F, which is of the essence of my invention.

The upper vibrating shear-arm, G, has secured to its outer end the upper shear-plate, H, is pivoted to the lower shear-arm at I, and is bifurcated or provided with arms K, carrying friction-rollers L, the arms straddling the cam F and the friction-rollers bearing against its periphery, as shown in Figs. 1 and 3.

My triple cam F is equal in all its diameters, and consequently, when rotated between the friction-rollers bearing upon its periphery, it causes three equal reciprocations of the upper shear arm and blade at each revolution, and is thus superior to a heart-cam, or to any other form of cam for converting rotary into vibratory or reciprocating motion.

In order to form the cam for any given amount of lateral motion, I take for the radius of a primary circle a radius which gives the versed sine of thirty degrees, equal to half the amount of motion required. I then lay off three times in this primary circle the chord of sixty degrees, sixty degrees apart. With these three lines as directrices, I construct three curves opposite them by using the diameter of the primary circle as a generator, one end of which moves along these chords, passing through the center, the other extremity producing the curve required, forming a cam in which, as above stated, all the diameters are equal, and which, when rotated, gives to any rigid body acted on at the extremities of any of its diameters six single vibrations or three complete reciprocations to each revolution of the cam.

In order to keep the upper shear-cutters in close contact with the lower, and to properly adjust the pressure of contact, I provide set-screws M, which pass through a pressure-plate, N, and through slots O in the upper shear-plate into the lower shear-plate, and clamp down the pressure-plate upon the upper shear-plate; but there is nothing novel in this.

Having thus described my invention, what I claim as new, and desire to secure by Letters Patent, is—

1. The triple cam F, of equal diametrical sections, and of the form specified, and illustrated in the drawings, substantially as described.

2. The combination of the triple cam F, of equal diametrical sections, and of the form specified, and illustrated in the drawings, with a vibrating or reciprocating arm, substantially as described.

GEORGE T. BECK.

Witnesses:
MARCUS S. HOPKINS,
WOODBURY LOWERY.